INVENTORS
George A. Stokes
and Jacob Menist.
By Jas. H. Griffin
ATTORNEY

G. A. STOKES & J. MENIST.
MACHINE FOR OPENING CANS.
APPLICATION FILED JUNE 26, 1916. RENEWED MAR. 8, 1918.

1,262,994.

Patented Apr. 16, 1918.
4 SHEETS—SHEET 3.

INVENTORS
George A. Stokes
and Jacob Menist.
By Jas. H. Griffin.
ATTORNEY

G. A. STOKES & J. MENIST.
MACHINE FOR OPENING CANS.
APPLICATION FILED JUNE 26, 1916. RENEWED MAR. 8, 1918.

1,262,994.

Patented Apr. 16, 1918.
4 SHEETS—SHEET 4.

INVENTORS
George A. Stokes
and Jacob Menist.
By Jas. H. Griffin
ATTORNEY

UNITED STATES PATENT OFFICE.

GEORGE A. STOKES, OF BROOKLYN, NEW YORK, AND JACOB MENIST, OF MATAWAN, NEW JERSEY, ASSIGNORS OF ONE-THIRD TO EDWIN D. HENDERSON, OF NEW YORK, N. Y.

MACHINE FOR OPENING CANS 1,262,994. Specification of Letters Patent. Patented Apr. 16, 1918.

Application filed June 26, 1916, Serial No. 105,851. Renewed March 8, 1918. Serial No. 221,329.

*To all whom it may concern:*

Be it known that we, GEORGE A. STOKES and JACOB MENIST, citizens of the United States, residing in the city of New York, borough of Brooklyn, county of Kings, and State of New York, and Matawan, county of Monmouth, and State of New Jersey, respectively, have invented a certain new and useful Machine for Opening Cans, of which the following is a specification.

This invention is a machine for opening cans, and the object of the invention is to provide a machine of this class which is adapted to expeditiously cut out the tops of cans of varying heights and diameters in a simple and efficient manner, and without necessitating undue work on the part of the operator.

The machine of this invention embodies many features of novelty, all of which coöperate to expedite the work to be done, and among which may be briefly enumerated, first, mechanism operable from a single shaft for clamping a can in place, positioning a cutter in coöperative relation thereto, and then rotating the can for the purpose of cutting out the top and simultaneously turning in the edges adjacent the cut-out; second, a cutter-head which is automatically operable to engage with the can for holding it in place during the cutting operation; third, means for automatically positioning the cutter with respect to various sizes of cans; fourth, a particular form of cutter mounting, by virtue of which the cutter is slowly forced into the can without the quick application of force heretofore necessary, which arrangement lengthens the life of the cutter in that breakage or dulling of the cutter is not so apt to occur; fifth, an improved means for gripping the bottom of the can, said means being so constituted that combined lever and cam actions coöperate to grip the can much tighter than was heretofore possible, and, sixth, means whereby the portion of the can which is cut out is gripped and automatically removed from the can subsequently to the cutting-out operation, so that the cut-out portions of the cans cannot fall into the contents of said cans subsequently to the cutting operation, but are automatically removed from their initial position to a position wherein they will be free from engagement with the cans.

Features and objects of the invention, other than those specified, as well as the advantages flowing therefrom, will be apparent from the hereinafter detailed description taken in conjunction with the accompanying drawings.

In the accompanying drawings we have illustrated different practical embodiments of the invention, but the constructions shown therein are to be understood as illustrative, only, and not as defining the limits of the invention.

Referring to the drawings, and more particularly to Figs. 1 to 8, inclusive, A designates a bed-plate adapted to be secured in any suitable manner to any convenient fixed support B. Bed-plate A is provided with a boss $a$, having a substantially vertical bearing, in which is adapted to be seated the stem $c$ of a table C, on which the cans D to be opened are adapted to be positioned. Stem $c$ is normally precluded from disengagement with its bearing by a set screw $c'$ which threads through the boss and engages with a circumferential channel formed in stem c.

Figures 1, 4:
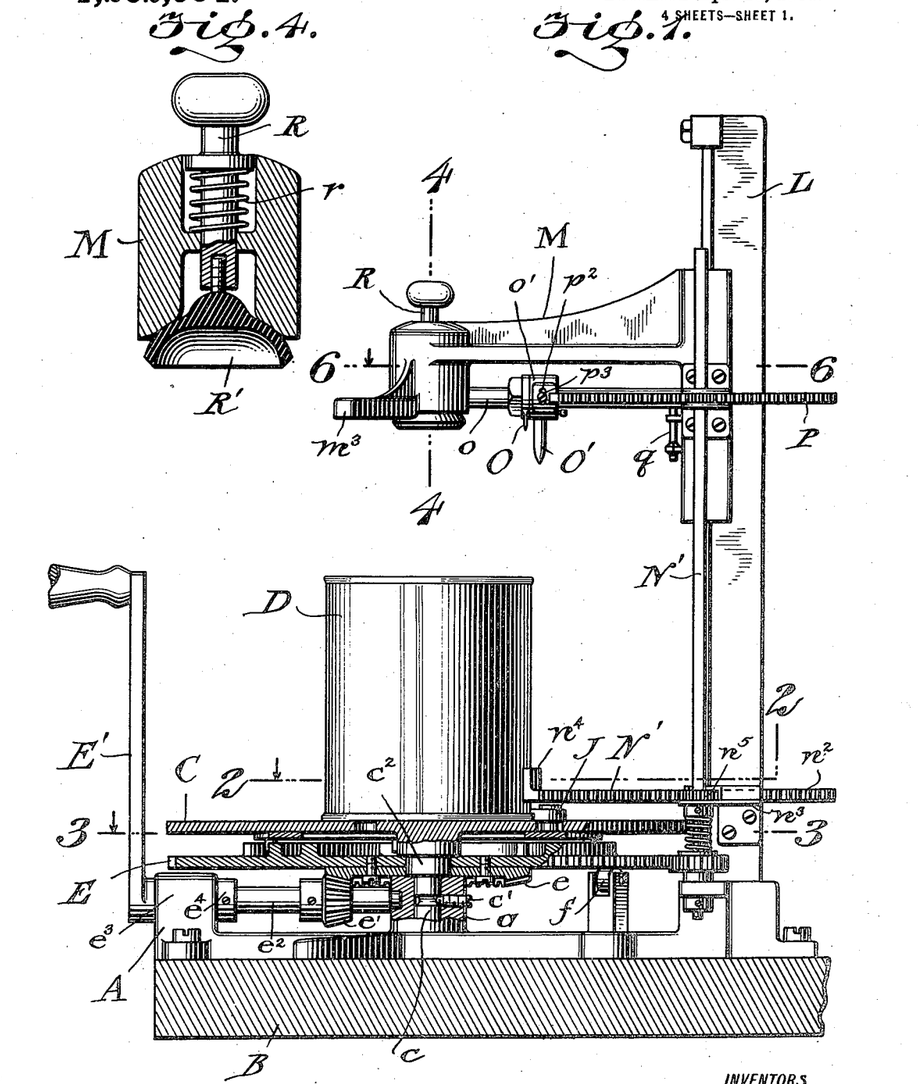
Figure 1 is a side elevation of a machine embodying the present invention, portions of the machine being shown in central section in the interest of clearness.
Fig. 4 is a vertical section on the line 4—4 of Fig. 1.

Table C is not seated directly upon the top of boss $a$, but its stem is stepped down, as shown in Fig. 1, so that one of the steps $c^2$ may serve as a bearing for rotatably mounting an operating plate E intermediate the lower face of table C and the top of boss $a$. To the under side of operating plate E is affixed a bevel gear $e$, with which coöperates a second bevel gear $e'$ fixed on shaft $e^2$. Shaft $e^2$ is journaled at its inner end in boss $a$, and near its outer end in a pillow-block $e^3$. A collar $e^4$ normally precludes longitudinal movement of the shaft, and to the outer end of said shaft is fixed a handle-carrying crank E', by means of which the operating plate may be rotated. To steady the operations of said plate, and to relieve stem $c$ of excess strain, two rollers $f$ are provided, which are positioned on upstanding fingers formed integral with bed-plate A, as clearly shown in Figs. 1 and 2. These rollers $f$ are so associated with operating plate E that they rest against the under surface thereof and preclude wabbling of the plate on its pivot.

It will be manifest that, in the structure described, both table C and plate E, which operates said table in a manner hereinafter to be described, are rotatable on a common pivot through the medium of the crank E' and the intermeshing bevel gears $e$ and $e'$. The parts are precluded from disengagement from one another by the set screw $c'$.

Figure 2:
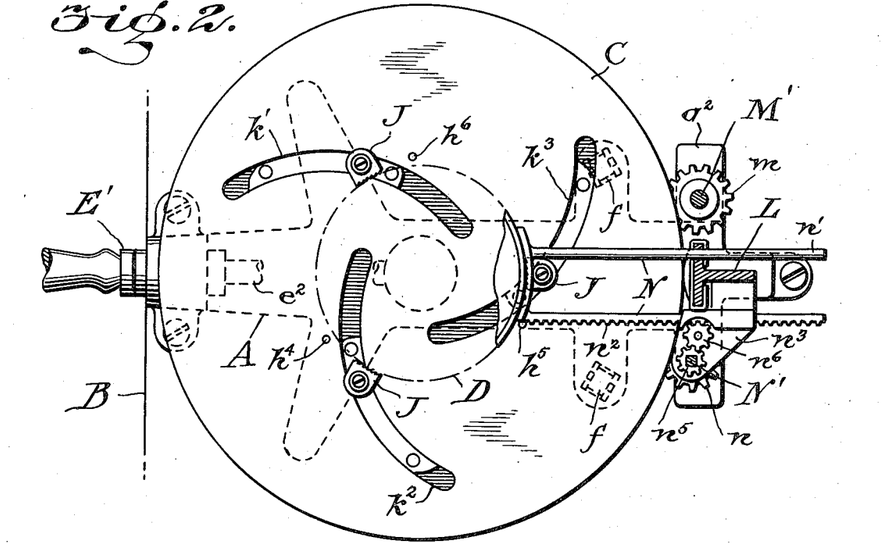
Fig. 2 is a horizontal section taken in the plane of the line 2—2 of Fig. 1.
Figure 3:
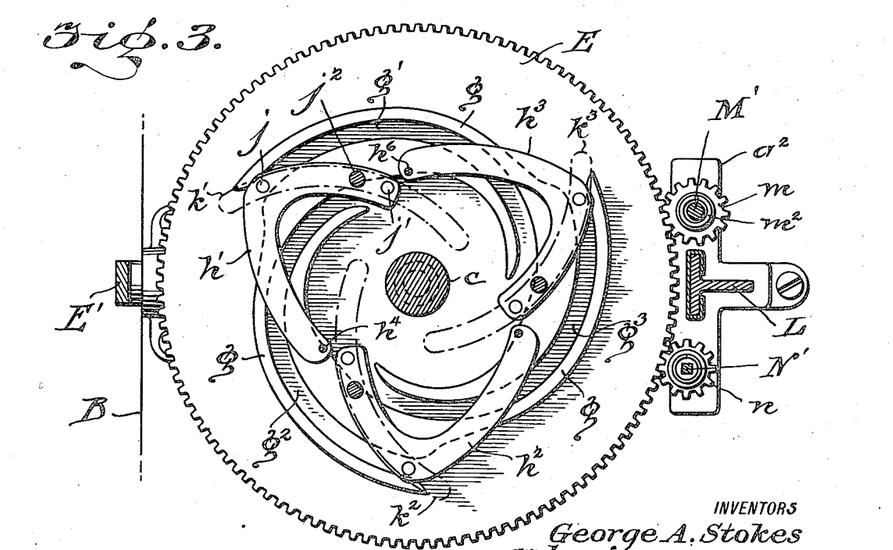
Fig. 3 is a similar section taken in the plane of the line 3—3 of Fig. 1.

Formed upon the upper face of operating plate E, as shown more particularly in Fig. 3, is a plurality of upstanding walls $g$, which are so shaped and proportioned that they collectively form, intermediate of their edges, a plurality of volute passages or channels $g'$ $g^2$ and $g^3$. The volute channels specified are not in the form of one continuous channel, but are separate and independent passages for the guidance of a plurality of trunnions carried by a plurality of elbow levers $h'$, $h^2$ and $h^3$, which are in turn pivotally mounted on the pivot pins $h^4$, $h^5$ and $h^6$, respectively, to the under side of table C, as clearly shown in Figs. 1, 2 and 3.

The association of the parts is such that there are two trunnions on each elbow lever, and each trunnion operates in a different volute passage from the other trunnion of the same elbow lever. For example, the two trunnions $j$ and $j'$, which are associated with the elbow lever $h'$, are so positioned that the trunnion $j$ is adapted for coöperation with the volute passage $g'$, while trunnion $j'$ is positioned for coöperation with the volute passage $g^2$. In like manner, the other two elbow levers are each provided with two similar trunnions, which operate in a like manner in different passages. All of the trunnions $j$, $j'$, etc., depend upon their respective elbow levers, but each lever is, in addition, provided with an upwardly extending post $j^2$, which passes through a volute-shaped slot in table C and carries at its upper end a clamping jaw J. There are three such slots, the slot $k'$ being associated with post $j^2$ of elbow lever $h'$, slot $k^2$ corresponding to the trunnions of the lever $h^3$. The relationship between the levers and the respective slots is illustrated best in Fig. 3, wherein the contour of the slots referred to is shown in dot-and-dash lines. It will be noted from this figure that, while both the slots and passages are of volute configuration, the slots are swung on a greater radius than are the volute passages of the operating plate.

The result of the foregoing arrangement is that, when table C is held against rotation, while crank E' is operated to rotate the operating plate, the trunnions of the respective elbow levers are caused to travel along the volute passages of the operating plate, with the result that they are oscillated on their pivotal connection with table C and clamping jaws J forced toward the center of the table, as will be clearly understood. The function of this operation is to cause clamping jaws J to engage with, and tightly clamp in position, the can D adapted to be secured in place on said table. It will be noted, moreover, that, because of the fact that two trunnions are simultaneously coöperating with two different volute passages, there will be a double cam action upon each elbow lever, which results in a more secure gripping action on the can than would be possible if only one trunnion were employed. Moreover, in the employment of two trunnions, the strain on the parts is distributed, so that no particular part is called upon to bear an excess strain during the gripping operation on the can.

It has been stated that the rotation of operating plate E, while table C is maintained stationary, will produce the gripping effect, and, in like manner, it will be obvious that, if table C is rotated, while the operating plate is stationary, the same effect will result. However, table C and its operating plate E will cease to be relatively movable as soon as the clamping jaws are in tight engagement with the can, so that further rotation of crank E' will serve to bodily rotate both parts in synchronism and also to rotate the can secured in place thereon. The rotation of the can is the initial result desired through the operation of these parts, it being the object of this invention to rotate the can while the same is positioned in coöperative relation with a practically stationary cutter.

Figure 5:
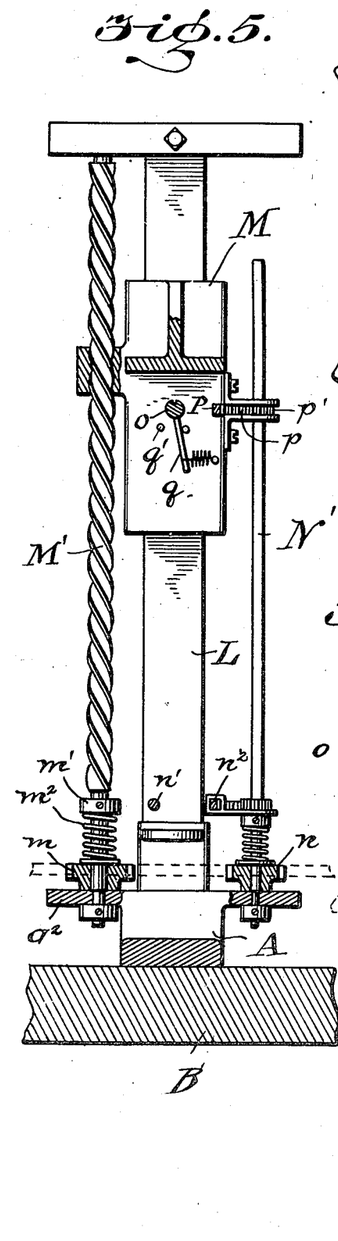
Fig. 5 is a view looking from the front of the machine rearwardly, with certain parts broken away to clearly show the mechanism for operating the cutter-head and associated mechanisms.
Figure 6:
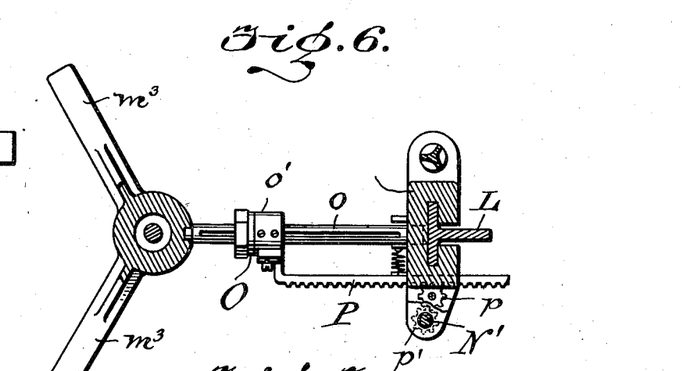
Fig. 6 is a section on line 6—6 of Fig. 1.

Mounted on the rear portion of bed-plate A is an upstanding standard L, which, as shown in Figs. 2 and 3, is preferably of T- shaped section whereby it is adapted to serve as a guide for a cutter-head M mounted for vertical movement thereon. Such movement is imparted to the cutter-head by means of a twist-shaft M', which is vertically mounted adjacent the guide and extends through a portion of the cutter-head, as shown in Fig. 5. The lower end of twist-shaft M' is cylindrical in shape, and carries a pinion $m$ loosely mounted on the shaft and seated on a laterally extending arm $a^2$ which is formed on bed-plate A and serves as a bearing for the lower end of the shaft. Positioned a short distance above pinion $m$ is a fixed collar $m'$, and intermediate said collar and pinion $m$ extends a tension spring $m^2$. Spring $m^2$ is coiled around shaft M' and serves as a friction clutch for normally frictionally maintaining pinion $m$ for rotation with shaft M', in order that said shaft may be rotated through the pinion. This rotation is imparted directly from operating plate E, which, as shown in Figs. 1 and 3, is circumferentially toothed to mesh with pinion $m$.

From the foregoing, it will be manifest that, when the operating plate is rotated, such rotation results in the rotary movement of twist-shaft M', which raises or lowers the cutter-head M in accordance with the direction of rotation of said plate. Assuming, therefore, that cutter-head M is in the position shown in Fig. 1, and crank E' is operated to rotate operating plate E in a direction to clamp the can D, such rotation of said plate will, through twist-shaft M' and its operating connections, lower the cutter-head until such time as two radially extending arms $m^3$, mounted thereon, come into engagement with the top of the can. The can will preclude further lowering action of the cutter-head, and, as the operation of crank E' is continued, the friction clutch mechanism, embodying collar $m'$ and spring $m^2$, will allow pinion $m$ to rotate idly on twist-shaft M'. There will, however, be considerable downward pressure on the cutter-head to oppose the friction of the clutch, and, accordingly, the can will be tightly pressed down upon table C, as well as securely gripped at its bottom by the clamping members J, as hereinbefore described.

This invention contemplates two methods of positioning a cutter so as to operate upon a can while the same is rotated in the manner specified. In the first method shown in Figs. 1 to 8, inclusive, the positioning of the cutter is entirely automatic, whereas, in the modified form shown in Figs. 9 to 14, inclusive, the positioning of the cutter is, to a large extent, manual. The preferred method shown in the first-mentioned figures will next be described.

Mounted on the opposite side of standard L from twist-shaft M', is an upstanding shaft N' preferably of polygonal cross-section, the lower end of which is provided with clutch mechanism identical with the clutch mechanism at the lower end of twist-shaft M', for the purpose of frictionally locking a pinion $n$ to the lower end of shaft N' in the same manner as pinion $m$ is frictionally clutched to twist-shaft M'. Pinion $n$ also meshes with the circumferential teeth of operating plate E, all as clearly shown in Figs. 2, 3 and 5, so that, when said plate is rotated, similar movement is imparted to shaft $n'$. The rotary movement of the shaft is limited, however, by a limiting member N, shown best in Figs. 1 and 2.

Member N embodies a guide rod $n'$ mounted for sliding movement through standard L and a rack $n^2$, similarly mounted in a laterally extending bracket $n^3$ formed on the standard, and the inner ends of rod $n'$ and rack $n^2$ are connected by a shoe $n^4$ adapted to engage with the periphery of a can in the manner shown in Figs. 1 and 2. A gear $n^5$ is fixed on shaft N' and seated on the upper face of bracket $n^3$, which gear operates rack $n^2$ through an intermediate idler $n^6$, mounted on the bracket, as shown in Fig. 2.

Thus, when operating plate E is rotated, shaft N' is similarly actuated to move the limiting member N into its extended position shown in Fig. 2, to such extent that the shoe $n^4$ at its forward end will engage with the can. When this engagement has taken place, further movement of the limiting member is precluded, and the clutch mechanism between shaft N' and the operating plate slips so as to allow of the idle rotation of pinion $n$, while shaft N' remains stationary.

Extending forwardly beneath cutter-head M, and fixed at its opposite ends in said head, is a rock-shaft $o$, on which is mounted a carrier $o'$, which supports a cutter, and an adjacent guide member O'. As shown particularly in Figs. 7 and 8, carrier $o'$ is slidably mounted on rock-shaft $o$, but is precluded from pivotal movement relative thereto by a feather and slot connection, so that, when rock-shaft $o$ is oscillated, the carrier and its associated parts are simultaneously rocked therewith. However, the carrier is freely slidable longitudinally of the rock-shaft, such longitudinal movement being imparted thereto by a rack P connected, through an idler $p$, with a gear $p'$ fixed on shaft N', see Figs. 5 and 6. The forward end of the rack is provided with a slot $p^2$, which loosely embraces the shank of a screw $p^3$ fixed in carrier $o'$, so that movement of the rack may impart sliding movement to the carrier, but not interfere with the oscillating movement of said carrier.

The relation of the carrier to the remaining parts of the machine is such that the guide O' is at all times in substantially vertical alinement with the can-engaging face of shoe $n^4$ of limiting member N, and, as these parts move in synchronism, being operated from a common shaft N', the movement of the shoe into a position to engage with the can near its bottom will cause a simultaneous movement of the carrier o' to a position wherein its guide member O' will engage with the circumference of the can at its top. Cutter O is fixed on the carrier adjacent guide member O' and in such position that, when the guide member is in engagement with the periphery of the can, the cutter will be in engagement with the top of said can just inwardly of the peripheral bead thereof. As all of the parts described are operated from the common crank E' it is manifest that the foregoing operations will be simultaneous, i. e., the can will be gripped at its bottom, the limiting member N' will be thrust forward to engage with the circumference of the can, and will cease its movement upon such engagement, thereby positioning the associated movable carrier o' in such relation to the can that, when cutter-head M is depressed, guide member O' will come into engagement with the periphery of the can at its top, while cutter O will engage with that portion of the top immediately interior of the peripheral bead. When the cutter is in this position, it is only necessary to force the cutter into the cover of the can to cause the cutting operation to take place upon the rotation of the can, as hereinbefore described.

Figures 7, 8:
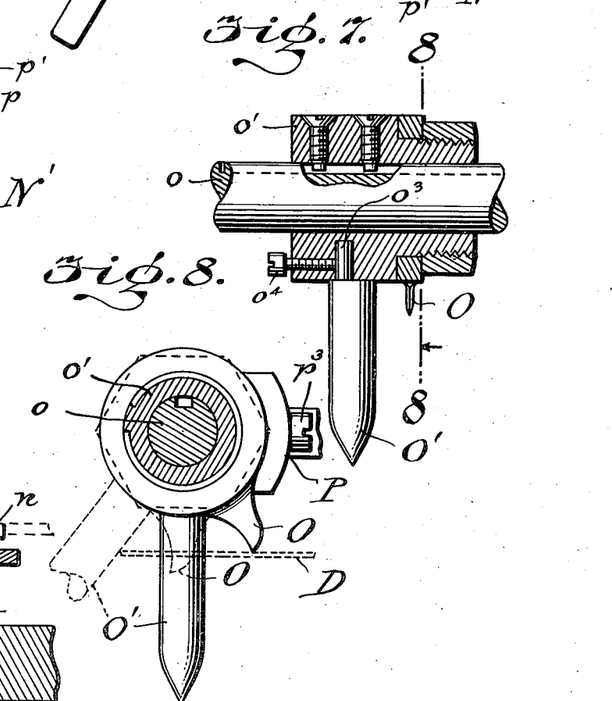
Fig. 7 is an elevation, partly in section, of the cutter and the guide for properly positioning said cutter relative to a can.
Fig. 8 is a section on line 8—8 of Fig. 7.

In can opening machines as heretofore constructed, the cutters have always been forced, with a quick forward action, through the wall of the can, and this frequently occasions breakage of the cutter and interferes with proper alinement thereof for the subsequent cutting operation. It will be noted, however, that the cutter of this invention is not forced downwardly into the can upon the depression of the cutter-head, but enters the can in a deliberate manner which will not distort the cutter or cause breakage. The means for accomplishing this end is inchoate in the oscillatory character of rock-shaft o. Its normal position, in which it is held by a spring-actuated arm $q$ (see Fig. 5), is such as to position the parts as shown in Fig. 8, with guide member O' substantially vertical, but with cutter O extending in angular direction, opposed to the direction of rotation of the can during the cutting operation. The parts are in the position shown in Fig. 8, with the cutter-head lowered upon the can, and, when the cutter-head comes to its lowermost position, the lower end of cutter O does not enter the top of the can (which is shown in dotted lines in Fig. 8), but simply rests lightly upon the upper face thereof in the position shown in full lines in said figure. However, when the can is rotated as hereinbefore described, the top of the can will be caused to travel against the point of the cutter, with the result that said cutter becomes wedged against the can top and, as the rotation continues, is forced through the wall of the can and partakes of the dotted line position of Fig. 8. During this operation, rock-shaft o is oscillated, i. e., is carried around by the forward movement of the cutter, until its spring-controlled arm $q$ engages with a stop $q'$ (see Fig. 5), at which time further rotation of the rock-shaft is precluded. At this time, cutter O will have assumed the position shown in dotted lines in Fig. 8, wherein it will be substantially upstanding relative to the top of the can, and is in such position as to operate with greatest efficiency during the cutting operation.

Guide member O' thus positions the cutter for operation and maintains it in its operative position during the cutting operation. It is, however, well understood that the peripheral flanges of cans vary with cans of different sizes, and it is, accordingly, desirable to provide means whereby the relation between guide member O and the can may be varied. This means is clearly shown in Fig. 7, wherein guide member O' is shown as provided with a stem $o^3$ which is formed off-center on said member and is adapted to seat in a recess in carrier o'. It will be manifest that the manual rotation of guide member O' will position its adjacent edge nearer or farther from the cutter, in accordance with the eccentric movement of said member about its stem. The relation between the parts may thus be readily brought about, and said guide may be locked in any position by means of a set screw $o^4$, as clearly shown in Fig. 7.

It will, of course, be understood that, after the positioning of the can in place and the impressing of the cutter into the can, said can is given at least one complete rotation, so as to cut the cover of the can entirely free from the sides thereof. Moreover, during the cutting operation, the cutter is maintained in close proximity to the peripheral bead of the can, with the result that the edge of the cut-away portion is rolled into the can, and no sharp edges are produced which might cut the hands of the operator during the subsequent emptying operation.

The foregoing mechanisms may be operated as a complete machine, but it is desirable to provide means for removing the cover after the same has been cut out, so that it will not fall into the can and pollute the contents thereof, or be rendered inaccessible for withdrawal. This means may partake of various forms, two of which are shown in the drawings. The preferred form is shown in Figs. 1 and 4, wherein cutter-head M is provided, near its outer end, with a vertically slidable plunger R, to the lower end of which is secured a suction cup R', and around which plunger is coiled a spring r, whose function is to normally elevate the plunger into the position shown in Fig. 4. The position of plunger R on cutter-head M is such that it will be in substantially vertical alinement with the vertical axis of a can positioned on the table. Thus, when the cutter-head is lowered into a position to engage with the top of the can, pressure may be manually applied to the top of plunger R to force suction cup R' tightly down upon the top of the can. During this operation, the air is expelled from the suction cup so that atmospheric pressure serves to maintain the cup in tight engagement with the top of the can.
This operation is accomplished prior to the cutting operation, and, as the cutting operation is carried on, the suction cup remains in engagement with the top of the can, plunger R freely rotating in its bearings during said operation. As soon, however, as one complete revolution in the cutting operation is completed, and the top of the can disconnected from the sides thereof, spring r immediately elevates the plunger and lifts the cut-out portion of the cover free from engagement with the can. The can may then be removed from table C by reversing the rotation of crank E', as will be well understood, and the portion of the cover held in the grip of the suction cup R' may be readily disengaged from said cup.

Figures 10, 11, 12, 13, 14:
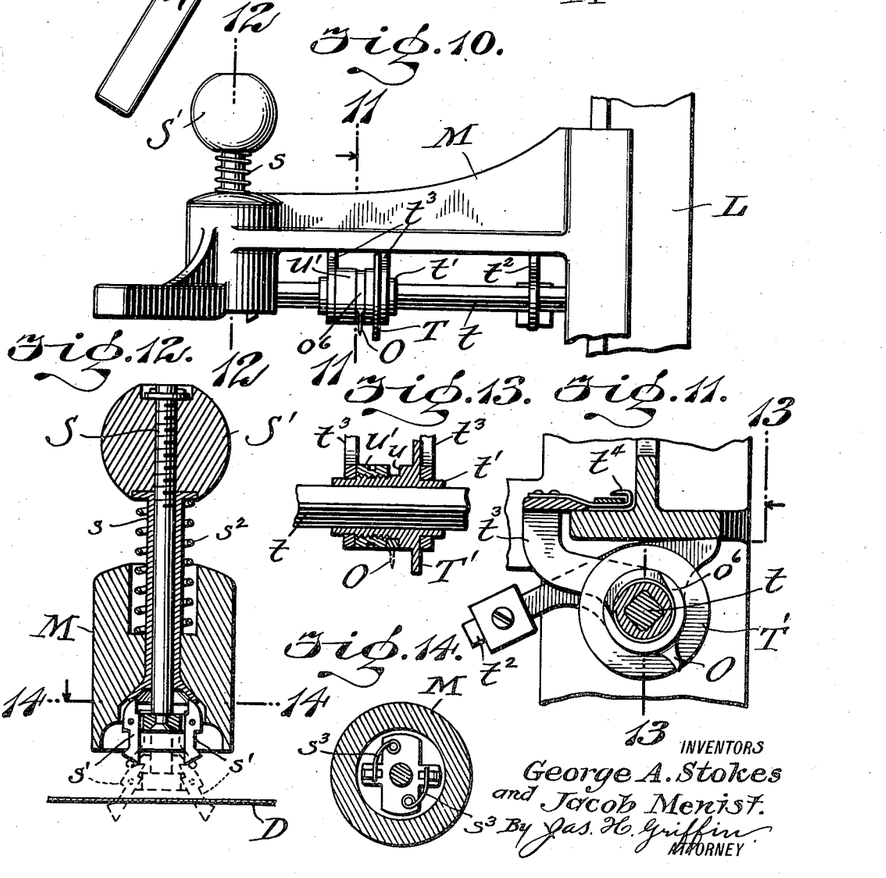
Fig. 10 is a side elevation of the structure shown in Fig. 9.
Figs. 11 and 12 are sections taken on the lines 11—11 and 12—12, respectively, of Fig. 10.
Fig. 13 is a section on line 13—13 of Fig. 11.
Fig. 14 is a section on line 14—14 of Fig. 12.

In Figs. 12 and 14, a modified form of cover-removing means is shown, this form being purely mechanical. The stem S is slidable interior of a sleeve s, and upon the upper portion of said stem is threaded a knob S'. The lower end of sleeve s is flanged outwardly to form an interior frusto-conical portion, with which engages the upper ends of two impaling members s' pivoted to a cross-head on the lower end of the stem. A spring $s^2$ normally elevates sleeve s. When the cutter-head is in operative position, a quick, downward impulse upon knob S' will force the impaling members s' through the top of the can, after which rotation of knob S' will depress sleeve s and force the lower, frusto-conical portion thereof downwardly against the tapered, upwardly extending arms of the impaling members s'. The result is shown in dotted lines in Fig. 12, viz., the lower ends of the impaling members will be forced apart to lock them in the cover of the can. When the cutting operation has been completed and the can removed, a reverse rotation of knob S' will release sleeve s, which will be elevated into its initial position by spring $s^2$, while the impaling members will be thrown back to their initial positions by springs $s^3$, as shown in Fig. 14, and the cut-out portion of the can released.

It will be understood that the two foregoing constructions merely exemplify the means which may be employed to remove the cut-away portion of the cover from the can, to preclude the depositing thereof in the interior of the can after it is cut loose. Other forms of this means may be employed if desired. For example, a magnet might be employed, of the "horse-shoe" or any other type, in lieu of suction cup R'. The present invention is not to be understood, therefore, as limited to the specific construction shown, as the means specified may be either mechanical, electrical, or automatic, in its operation.

Figure 9:
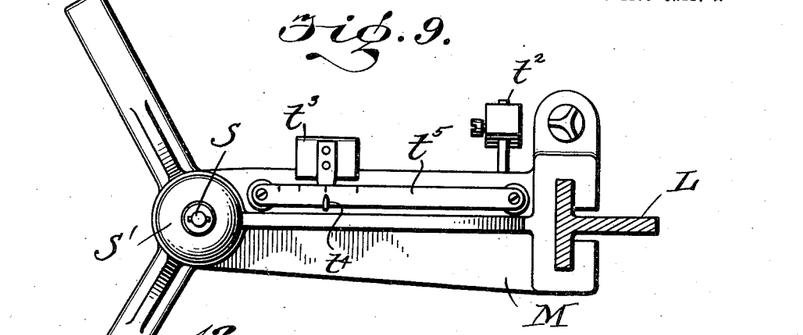
Fig. 9 is a plan view of a modified form of cutter-head and its associated mechanisms.

In the construction of the machine shown in Figs. 1 to 8, inclusive, and hereinbefore described, the cutter is automatically positioned relative to the can to be operated upon, and varying diameters in the can construction will not in the least affect the automatic operation described. The automatic arrangement of the machine is the form which it is preferred to employ, but the machine may be so organized, if desired, that the adjustment of the cutter-head may be manually, and not automatically, controlled by limiting member N. This brings about a great simplification in the machine, in that the limiting member with its associated gear, the shaft N', and the carrier operating rack P, are dispensed with. Such modified form of construction is shown in Figs. 9, 10 and 11.

The carrier t', which corresponds to carrier o', is slidably mounted on a rock-shaft t, which corresponds to the rock-shaft o. In lieu of the feather and slot connection, however, the shaft is square, as shown in Fig. 11, and fits through a square passage in the carrier member. The guide member T' of this modified form is shown as a disk integral with the carrier t', while the cutter is designated by the reference character O. In lieu of the spring-impelled arm q, associated with the rock-shaft o, the rock-shaft t has mounted thereon a weighted lever $t^2$ which serves to normally maintain the shaft in a position to commence the cutting operation by the cutter O. The upper edge of lever $t^2$ is so shaped that it engages with the under side of the cutter-head to limit the oscillating movement of the rock-shaft in either direction, thereby serving the same function as the pin or stop q' of the preferred construction.

The carrier member t' may be manually moved along the rock-shaft t by means of a frame $t^3$ which is secured thereto. The frame reaches upwardly and over one side of the cutter-head and carries a pointer or finger $t^4$ adapted to coöperate with a scale $t^5$ on which is preferably formed suitable designations corresponding to the various diameters or sizes of the cans. Thus, if a three inch can were placed in position for operation, the frame $t^3$ is grasped in the hand of the operator and slid along the rock-shaft and cutter-head into such position that the finger or pointer $f^4$ will register with the designation on the scale corresponding to a three inch diameter, and this operation will position the cutter and guide member in place for correct co-action with the can. The cutting operation will be the same as hereinbefore described relative to the preferred embodiment.

It will, of course, be understood that in the modified form of construction described, the cutter-head is actuated from a twist-shaft M' which automatically raises or lowers the cutter in accordance with the direction of rotation of the operating crank. In Figs. 11 and 13 is shown the preferred manner of mounting the cutter O upon its carrier member. It is quite essential in the construction shown, that the cutter be rigidly mounted on said carriage, but it is also desirable that the structure be such that a cutter may be removed and replaced without necessitating the dismantling of the projecting parts of the machine. In the construction shown in Figs. 7 and 8, the portion which carries the cutter is merely provided with a circular hole adapted to be passed over a shank on the carrier member and locked in place by a jam nut. This structure necessitates the dismantling of the rock-shaft $o$ to remove and replace the cutter. However, in the construction shown in Fig. 11, the cutter carrying member is in the shape of a yoke $o^6$ which may be slipped on from one side of the carrier so as to embrace the portion thereof intermediate its shoulder $u$ and a jam nut U', as shown in Figs. 11 and 13. The jam nut may then be tightened to lock the cutter in place. This is the preferred form of construction as no part need be dismantled to renew a cutter, but simply a slight loosening of the jam nut $u'$ is all that is required.

Having thus fully described the invention, what we claim as new, and desire to secure by Letters Patent, is:

1. In a machine for opening cans, the combination of a rotatable table provided with means for gripping a can and holding it in position, whereby said can is rotated with the table, a cutter positioned above the table for engagement with the top of the can, means for rotating the table, while the cutter is in engagement with the cam, for cutting out the top of the can, and means independent of the cutter, and mounted for rotary movement with the can, for removing the cut out portion of the can after the same has been cut-away from the body of said can.

2. In a machine for opening cans, the combination of a rotatable table provided with means for gripping a can and holding it in position, a cutter-head for engaging the top of the can to maintain the can in engagement with the table, a cutter mounted on the cutter-head and adapted to engage with the top of the can, means for simultaneously rotating the table and can, while the cutter is in engagement with the can, for the purpose of cutting out the top of the can, and means mounted on the cutter-head, and rotatable with the can, for precluding the cut-away portion of the can from falling into the body of the can upon the completion of the cutting operation.

3. In a machine for opening cans, the combination of means for cutting out a portion of a can when said can is rotated, with means rotatable with the can for precluding the cut-away portion from falling into the body of the can at the completion of the cutting operation.

4. A machine for opening cans embodying a rotatable table, a concentrically rotatable operating plate positioned below the table, clamping jaws associated with the table and operating plate and extending above the face of the former for engaging a can in gripping relation when either the table or plate are rotated, a cutter-head mounted for vertical movement above the table, and means for simultaneously rotating the actuating plate and imparting verticle movement to the cutter-head, whereby the cutter-head may be moved into or out of engagement with the top of the can.

5. A machine for opening cans embodying a rotatable table, a concentrically rotatable operating plate positioned below the table, clamping jaws associated with the table and operating plate and extending above the face of the former for engaging a can in gripping relation when either the table or plate are rotated, a cutter-head mounted for vertical movement above the table, means for imparting rotation to the actuating plate, and connections between the actuating plate and the cutter-head whereby rotation of the former imparts vertical movement to the latter.

6. In a machine for opening cans, the combination of a rotatable operating plate, means actuated thereby for gripping a can near its lower edge, means for operating the actuating plate, a cutter-head movable perpendicular to the axis of rotation of said plate, and connections between the plate and the cutter-head for imparting movement to the cutter-head when the plate is rotated, whereby said cutter-head may be moved into and out of engagement with the top of the can in accordance with the direction of the rotation of the plate.

7. A machine for opening cans embodying a rotatable table, a concentrically rotatable operating plate positioned below the table, clamping jaws associated with the table and operating plate and extending above the face of the former for engaging a can in gripping relation when either the table or plate are rotated, a cutter-head mounted for vertical movement above the table, means for imparting rotation to the actuating plate, connections between the actuating plate and the cutter-head, whereby rotation of the former imparts vertical movement to the latter, a cutter mounted on the cutter-head, and means actuated by the rotation of the operating plate for positioning the cutter in proper relation to the can.

8. In a machine for opening cans, the combination of a rotatable operating plate, means actuated thereby for gripping a can near its lower edge, means for operating the actuating plate, a cutter-head movable perpendicular to the axis of rotation of said plate, connections between the plate and the cutter-head for imparting movement to the cutter-head when the plate is rotated, whereby said cutter-head may be moved into and out of engagement with the top of the can in accordance with the direction of the rotation of the plate, a cutter mounted on the cutter-head and means actuated by the rotation of the operating plate for positioning the cutter in proper relation to the can.

9. In a machine for opening cans, the combination of a rotatable operating plate, means actuated thereby for gripping a can near its lower edge, means for operating the actuating plate, a cutter-head movable perpendicular to the axis of rotation of said plate, connections between the plate and the cutter-head for imparting movement to the cutter-head when the plate is rotated, whereby said cutter-head may be moved into and out of engagement with the top of the can in accordance with the direction of the rotation of the plate, a cutter mounted on the cutter-head, means actuated by the rotation of the operating plate for positioning the cutter in proper relation to the can, and means adapted to engage with the side of the can for restricting the movements of the cutter by the operating plate to such extent as to position the cutter in proper operating position for the particular size of can on the machine.

10. In a machine for opening cans, the combination of a rotatable table provided with means for gripping a can and holding it in position, a cutter positioned above the table for engagement with the top of the can, means for rotating the table, while the cutter is in engagement with the can, for cutting out the top of the can, means independent of the cutter for removing the cut out portion of the can after the same has been cut-away from the body of the can, and means operable by the table rotating means for moving the cutter-head into engagement with the can prior to the cutting operation and disengaging said head from the can subsequent to the cutting operation.

11. In a machine for opening cans, the combination of means for gripping and rotating a can, a cutter-head, a cutter pivotally mounted for back and forth oscillation on the cutter-head, means for normally maintaining the cutter in an inclined direction opposed to the direction of rotation of the can, said means being adapted to allow of the oscillation of the cutter in the direction of rotation of the can when the latter is rotated, whereby the cutter is forced through the wall of the can, and means for arresting the pivotal movement of the cutter after it has been forced through the can wall, and for maintaining it stationary during the subsequent cutting operation.

12. In a machine for opening cans, the combination of means for gripping and rotating a can, a cutter-head, a cutter mounted for edgewise oscillation on the cutter-head, means for normally maintaining the cutter in an inclined direction opposed to the direction of rotation of the can, and stop means for limiting the oscillation of the cutter in the opposite direction, whereby, when the can is rotated, the cutter is oscillated into engagement with the stop means and simultaneously forced through the wall of the can, said stop means maintaining the cutter against oscillation during the subsequent operation of cutting the can.

13. In a machine for opening cans, the combination of means for rotating a can, a cutter mounted for oscillation, means for normally maintaining the cutter in an inclined direction opposed to the direction of rotation of the can, and means for bringing the cutter into engagement with the can while in said inclined position, whereby subsequent rotation of the can oscillates the cutter and forces the same through the wall of the can, said cutter being thereafter maintained against further oscillation during the subsequent operation of cutting the can.

14. A machine for opening cans embodying means for gripping a can, means for rotating said can, a cutter, mechanism for shifting the cutter radially of the axis of rotation of the can, connections between the cutter-shifting mechanism and the can-rotating means for actuating the former from the latter, and means for bodily moving the cutter in a direction parallel to the axis of rotation of the can.

15. A machine for opening cans embodying a rotatable table, means for securing a can thereon, a cutter movable perpendicularly to the axis of rotation of the table, means for rotating the table, and means operable by the table rotating means for imparting movement to the cutter in a direction perpendicular to the axis of rotation of the table when said table is rotated.

16. In a machine for opening cans, the combination of a rotatable table, means for securing a can thereon, a cutter-head movable perpendicularly to the axis of rotation of the table, means for simultaneously rotating the table and moving the cutter-head into engagement with the can positioned thereon, and means for rendering the cutter-head irresponsive to the operations of the table rotating means after said head has engaged with the can.

17. In a machine for opening cans, the combination of a rotatable table, means for securing a can thereon, means for rotating the table, a cutter-head mounted for sliding movement longitudinally of the axis of rotation of the table, connections between the table rotating means and the cutter-head for bringing said cutter-head into engagement with the can when the table is rotated, said connections embodying means whereby the cutter-head is rendered irresponsive to the operations of the table rotating means when said cutter-head is in engagement with the can.

18. In a machine for opening cans, the combination of a rotatable table, means for securing a can thereon, means for rotating the table, a cutter-head mounted for sliding movement longitudinally of the axis of rotation of the table, connections between the table rotating means and the cutter-head for bringing said cutter-head into engagement with the can when the table is rotated, said connections embodying a friction clutch whereby the cutter-head is rendered irresponsive to the operations of the table rotating means when said cutter-head is in engagement with the can.

19. A machine for opening cans, the combination of a substantially horizontal rotatable table, means for securing a can thereon, means for rotating the table, a cutter-head mounted for vertical movement above the table, said cutter-head being normally elevated above the top of the can, and connections between the cutter-head and table rotating means, whereby the rotation of the table causes the cutter-head to be lowered into engagement with the top of the can for steadying the same during the cutting operation.

20. A machine for opening cans, the combination of a substantially horizontal rotatable table, means for securing a can thereon, means for rotating the table, a cutter-head mounted for vertical movement above the table, said cutter-head being normally elevated above the top of the can, and a twist-shaft rotatable by the table rotating means and coöperating with the cutter-head for lowering the cutter-head into engagement with the can, when the table is rotated, for the purpose of steadying the can during the cutting operation.

21. In a machine for opening cans, the combination of a rotatable table, means for securing the can in upright position on the table, means for rotating the table, a cutter-head mounted for movement toward and away from the table, a cutter mounted on the cutter-head, and means associated with the table rotating means for automatically lowering the cutter-head into engagement with the can, when the table rotating means is actuated, and simultaneously shifting the cutter, radially of the can, into proper cutting relation to the can.

22. In a machine for opening cans, the combination of a rotatable table, means for securing a can on the table, means for rotating the table, a cutter-head movable longitudinally of the axis of rotation of the table, a cutter mounted on the cutter-head and movable radially of the axis of rotation of the table, and means operated by the table rotating means for lowering the cutter-head into engagement with the top of the can and shifting the cutter radially of the can into proper cutting position.

23. In a machine for opening cans, the combination of a rotatable table, means for securing a can on the table, means for rotating the table, a cutter-head movable longitudinally of the axis of rotation of the table, a cutter mounted on the cutter-head and movable radially of the axis of rotation of the table, means operated by the table rotating means for lowering the cutter-head into engagement with the top of the can and shifting the cutter radially of the can into proper cutting position, and means for precluding over-travel of the cutter radially of the can.

24. In a machine for opening cans, the combination of a rotatable table, means for securing a can on the table, means for rotating the table, a cutter-head movable longitudinally of the axis of rotation of the table, a cutter mounted on the cutter-head and movable radially of the axis of rotation of the table, means operated by the table rotating means for lowering the cutter-head into engagement with the top of the can and shifting the cutter radially of the can into proper cutting position, and means adapted for engagement with the can for precluding over-travel of the cutter radially of the can.

25. In a machine for opening cans, the combination of a rotatable table, means for securing a can on the table, means for rotating the table, a cutter-head movable longitudinally of the axis of rotation of the table, a cutter mounted on the cutter-head and movable radially of the axis of rotation of the table, means operated by the table rotating means for lowering the cutter-head into engagement with the top of the can and shifting the cutter radially of the can into proper cutting position, means for precluding over-travel of the cutter radially of the can, and means for rendering the cutter-head and cutter irresponsive to said operations of the table rotating means during the cutting operation.

26. In a machine for opening cans, the combination of a table provided with a plurality of substantially volute slots, a plurality of levers pivoted to said table and provided with clamping jaws mounted on said levers and extending through the slots in the table and above the surface thereof, an operating plate mounted for rotation coaxially with the table and immediately beneath the same, said plate being provided with a plurality of substantially volute channels, trunnions mounted on said levers and extending into the volute channels of the operating plate, whereby relative rotation between the plate and table impart movement to the clamping jaws toward and away from the axis of rotation, corresponding to the direction of rotation.

27. In a machine for opening cans, the combination of a table provided with a plurality of substantially volute slots, a plurality of levers pivoted to said table and provided with clamping jaws mounted on said levers and extending through the slots in the table and above the surface thereof, an operating plate mounted for rotation coaxially with the table and immediately beneath the same, said plate being provided with a plurality of substantially volute channels, trunnions mounted on said levers and extending into the volute channels of the operating plate, whereby relative rotation between the plate and table impart movement to the clamping jaws toward and away from the axis of rotation, corresponding to the direction of rotation, and means coöperating with the plate for rotating the same.

28. A machine for opening cans, the combination of a table provided with a plurality of substantially volute slots, a plurality of levers pivoted to said table, clamping jaws mounted on the levers and extending through the slots in the table, an operating plate mounted for coaxial rotation relative to the table and having formed thereon a plurality of substantially volute guides, a plurality of trunnions mounted on each lever and extending into coöperative relation with a plurality of substantially volute guides on the operating table, whereby relative rotation between the table and plate pivotally move said levers to bring the clamping jaws into contracted or expanded relation to one another, corresponding to the direction of rotation.

29. A machine for opening cans, the combination of a table provided with a plurality of substantially volute slots, a plurality of levers pivoted to said table, clamping jaws mounted on the levers and extending through the slots in the table, an operating plate mounted for coaxial rotation relative to the table and having formed thereon a plurality of substantially volute guides, a plurality of trunnions mounted on each lever and extending into coöperative relation with a plurality of substantially volute guides on the operating table, whereby relative rotation between the table and plate pivotally move said levers to bring the clamping jaws into contracted or expanded relation to one another, corresponding to the direction of rotation, and means for rotating the operating plate.

30. A machine for opening cans, the combination of a table provided with a plurality of substantially volute slots, a plurality of levers pivoted to said table, clamping jaws mounted on the levers and extending through the slots in the table, an operating plate mounted for coaxial rotation relative to the table and having formed thereon a plurality of substantially volute guides, a plurality of trunnions mounted on each lever and extending into coöperative relation with a plurality of substantially volute guides on the operating table, the contour of said guides conforming substantially to volutes swung on a smaller radius than volutes which form the contour of the slots in the table.

31. In a machine for opening cans, the combination of means for cutting out a portion of the can, a plurality of impaling members adapted to be thrust through the portion of the can to be cut away previous to the cutting operation, and means for spreading said impaling members to prevent their withdrawal from the cut-out portion of the can subsequent to the cutting operation, whereby the cut-out portion is prevented from falling into the body of the can at the completion of the cutting operation.

In testimony whereof we have signed our names to this specification.

GEORGE A. STOKES.
JACOB MENIST.